US008282079B2

(12) United States Patent
Petti

(10) Patent No.: US 8,282,079 B2
(45) Date of Patent: Oct. 9, 2012

(54) WIRE INSTALLATION TOOL

(76) Inventor: Enrico Petti, New City, NY (US)

( * ) Notice: Subject to any disclaimer, the term of this patent is extended or adjusted under 35 U.S.C. 154(b) by 255 days.

(21) Appl. No.: 12/700,497

(22) Filed: Feb. 4, 2010

(65) Prior Publication Data

US 2011/0186794 A1 Aug. 4, 2011

(51) Int. Cl.
*H02G 1/08* (2006.01)

(52) U.S. Cl. ...... 254/134.3 R; 254/134.3 FT; 254/134.4

(58) Field of Classification Search ......... 254/134.3 FT, 254/134.3 R, 134.4

See application file for complete search history.

(56) References Cited

U.S. PATENT DOCUMENTS 4,026,521 A * 5/1977 Clark .............................. 254/28
5,687,954 A * 11/1997 Schroeder ............ 254/134.3 FT
5,887,855 A * 3/1999 Whitney et al. ........ 254/134.3 R
5,888,035 A * 3/1999 Cutler ........................... 408/225
5,938,180 A * 8/1999 Walsten ............... 254/134.3 FT
6,840,483 B1 1/2005 Dickens
6,991,220 B2 * 1/2006 Rivers et al. ......... 254/134.3 FT
7,137,181 B2 * 11/2006 Ifort ................................ 29/235
7,354,228 B2 4/2008 Lambert
7,484,711 B2 * 2/2009 Pyron .................. 254/134.3 FT
2006/0069391 A1 * 3/2006 Jackson .......................... 606/62
2008/0028537 A1 * 2/2008 Tripp ................................ 7/108
2009/0287225 A1 * 11/2009 Olsen et al. ................... 606/139
2011/0186794 A1 * 8/2011 Petti ....................... 254/134.3 R

* cited by examiner

*Primary Examiner* — Lee D Wilson
(74) *Attorney, Agent, or Firm* — James K. O'Hare

(57) ABSTRACT

A wire installation tool having a handle with a first opening for receiving a wire attached to a tube having a second opening for evacuating the wire. In one embodiment, the handle has a lip with external radius larger than that of the tube allowing the tube to be inserted in the drill hole of a structure with the handle engaging the structure. This configuration allows a technician to easily feed cabling through the drill hole in the inner wall of an existing structure. The tool is particularly useful for safely feeding wiring through a drill created through the first and second wallboards of an inside wall.

17 Claims, 4 Drawing Sheets

WIRE INSTALLATION TOOL

FIELD

The invention relates generally to the field of hand tools. More specifically, the invention relates to hand tools used for installing wiring in existing structures.

BACKGROUND

Many modern electronic devices such as television sets, computers, telephones, alarm systems and other devices used in buildings and other structures require extensive wiring. The use of many of these modern electronic devices is often not anticipated at the time the building or other structure is erected. Introduction of these devices into the building or structure often requires modifying the building or structure slightly to accommodate the wiring. To accommodate the wiring, holes may be drilled in the walls of the existing structure. Wires can then be fed through the drill holes providing additional wiring access to selected portions of the building or structure.

For example, a television set may be added to a bedroom in which there is no television cable outlet. A television cable outlet may, however, exist in an adjacent living room. To accommodate the television set in the bedroom, a technician can drill a hole through the inner wall separating the living room and the bedroom room and feed a television cable through the wall. The drill hole in the inner wall might go through the wall board of the living room forming an entrance drill hole and through the wall board of the bedroom forming an exit drill hole. The technician can then feed the television cable through the entrance drill hole in the living room wall board and then try to manipulate the cable to feed the television cable through the living room wall board. Further complicating this feeding task is the fact that there is usually open space between the first wall board and the second wall board. Not surprisingly, feeding the television cable or any other type of wire through both the entrance and exit drill hole can be a time consuming and frustrating task.

Technicians approach this task in different ways. Some technicians will try to feed the wire through the second hole by peering through the first hole and then wiggling the wire to try to feed it through the second hole. This is problematic not only because it requires some dexterity and skill but also because electrical wiring can also be present in the wall board to wall board presenting a shock hazard. Other technicians may use fish tape to help feed the wire through the hole. Technicians often insert the fish tape through the first and second drill holes, then attach the fish tape to the wire and then pull the wire through the drill holes. It can be appreciated that this is also a time practice since it requires feeding the fish tape through the drill hole, then going to the other side of the wall attaching the fish tape to the cable and then returning to the feed through side again to pull the fish tape and the cable back through the wall.

Thus, it is apparent that there is a need for more efficient and safe tools for installing wire in an existing building or structure. The invention addresses this need as well as other needs.

SUMMARY

In an exemplary embodiment the wire installation tool has a handle with a first opening for receiving a wire is attached to a tube having a second opening for evacuating the wire. The handle at some point may have a lip with external radius larger than that of the tube allowing the tube to be inserted in the drill hole of a structure allowing the handle to engage with the structure.

The wire installation tool can, for example, be inserted in the drill hole of an inside wall with the lip of the handle engaging the wallboard and the tube extending through the inside wall. Cabling can then easily be fed into the first opening at the end of the handle with the wire evacuating through the second opening at the end of the tube. In this way, wiring can quickly and easily be fed through the wall.

BRIEF DESCRIPTION OF THE FIGURES

Claimed subject matter is particularly pointed out and distinctly claimed in the concluding portion of the specification. However, such subject matter may be understood by reference to the following detailed description when read with the accompanying drawings in which:

DETAILED DESCRIPTION

Methods and apparatuses that implement the embodiments of the various features of the disclosure will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least one embodiment of the invention. The appearance of the phrase "in one embodiment' or "an embodiment" in various places in the specification are not necessarily all referring to the same embodiment. Throughout the drawings, reference numbers are re-used to indicate correspondence between the referenced elements. In addition, the first digit of each reference number indicates the figure in which the element first appears.

Figure 1:
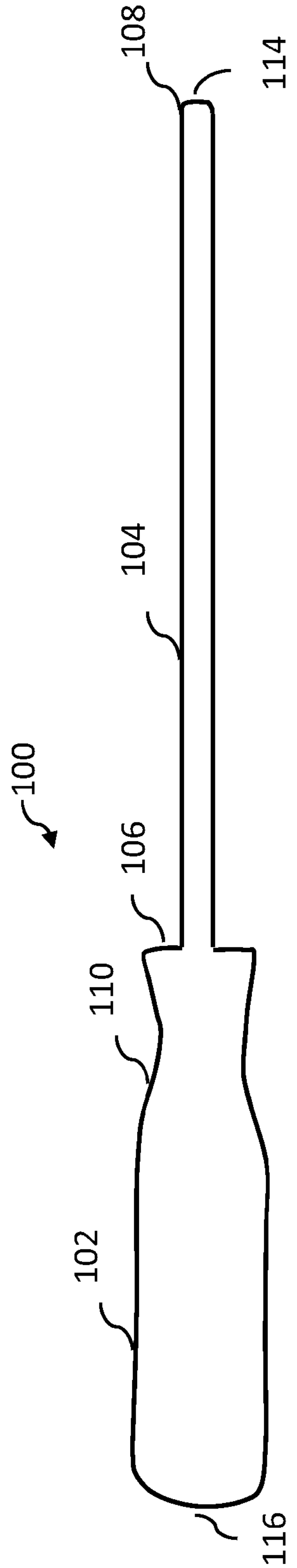
FIG. 1 shows an illustration of a side view of an exemplary embodiment of the present invention.

FIG. 1 shows a side view 100 of an exemplary embodiment of the wire installation tool. The wire installation tool 100 includes a handle 102 connected with a tube 104. The handle 102 has a lip 106 at a distal end. The tube 104 has a chamfer 108 at its distal end. The handle 102 has a handle opening 116 at its proximal end and a curved surface 100 near the lip 106. The tube 102 has a tube opening 114 at its distal end.

The handle 102 is adapted to be held comfortably in a hand with a closed grip forming a gripping means. The handle 102 has a curved surface 110 accommodating the forefinger and thumb of the closed grip. The lip 106 portion of the handle 110 is substantively flat forming an engaging means for engaging a wallboard or other structural surface. The handle opening 116 for receiving a wire is located at the proximal end of the handle 102. The handle 116 may be formed from a variety of materials including plastics, woods, rubbers, metals, composites and/or any other rigid or semi rigid material.

The handle 102 is connected with the tube 104. The tube 104 is substantially cylindrically shaped with a hollow substantially cylindrically shaped interior. The tube 104 has a chamfer 108 of approximately 35 degrees at the distal end that aids a technician in inserting the wire installation tool in a snug fitting drill hole. The tube 104 is preferably rigidly connected with the handle 102. The tube 102 may be formed from a variety of materials including plastics, woods, rubbers, metals, composites and/or any other rigid or semi rigid materials. The tube 104 may extend longitudinally almost through the entire handle 102 to the handle opening 116.

Other embodiments feature varying lip shapes that accommodate varying structural engagement surfaces such as corners, curved and cantilevered surfaces. Other embodiments also feature curved handle interiors and handle openings at more distal locations on the handle. The chamfer configuration varies in different embodiments with some embodiments featuring chamfers with large chamfer angles, other embodiments featuring chamfers with small chamfer angles and still other embodiments featuring no chamfer at all. In various embodiments, the handle is composed primarily of an electrical insulating material to prevent electric shock. In other embodiments the handle includes an electrically insulating covering for preventing electric shock.

Figure 2:
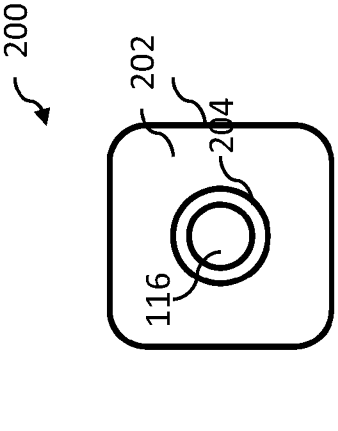
FIG. 2 shows an illustration of a rear view of the exemplary embodiment shown in FIG. 1.

FIG. 2 shows a rear view 200 of the exemplary embodiment of the wire installation tool. The wire installation tool has a rear surface 202 having a double flair 204 forming a recess in the rear surface 202 with the double flair 204 further defining handle opening 116. The double flair 204 aids in feeding wire (not shown) into the handle opening 116. The double flair 204 is particularly useful when the wire diameter is close to the diameter of the handle opening 116.

Figure 3:
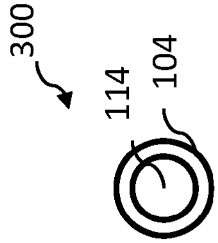
FIG. 3 shows an illustration of a front view of an exemplary embodiment shown in FIG. 1.

FIG. 3 shows a front view 300 of the exemplary embodiment of the wire installation tool. The wire installation tool includes the tube 104 that defines the tube opening 114. In this embodiment, the tube opening 114 is substantially the same diameter as the handle opening 116.

Figure 4:
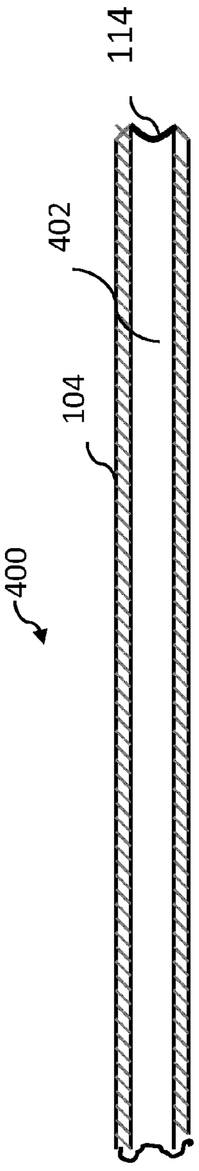
FIG. 4 shows a cutaway cross sectional view of the tube in the exemplary embodiment shown in FIG. 1.

FIG. 4 shows a cutaway cross section 400 of the exemplary embodiment of the tube 104 portion of the wire installation tool. On the distal side of the tube is the tube opening 114 and chamfer 108. The tube opening 114 defines an opening into tube passageway 402. The tube 104 is connected with the handle 102 at the handle's distal end. In this embodiment, tube 104 extends longitudinally almost until the handle opening 116. The tube passageway 402 is substantially cylindrical allowing a wire to be fed through the tube passageway 402 and out the tube opening 114.

Figure 5:
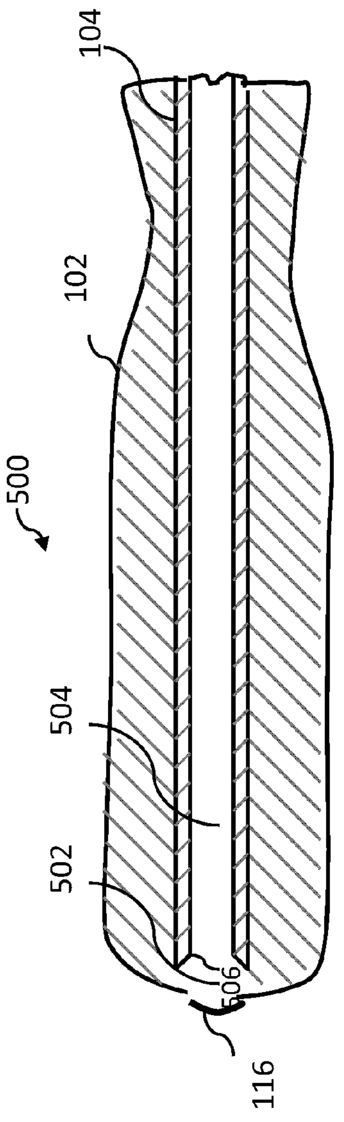
FIG. 5 shows a cross sectional view of the handle portion in the exemplary embodiment shown in FIG. 1.

FIG. 5 shows a cross section 500 of the exemplary embodiment of the handle 102 with a cutaway of the tube 104 of the wire installation tool. The handle 102 has a handle opening 116 that defines an opening into handle passageway 502. The handle passageway 502 defined by the handle configuration, transitions to the tube passageway 402 defined by the tube configuration inside the handle 102. In this embodiment, the handle passageway 502 and tube passageway 504 are substantially cylindrical, longitudinally aligned, with equal radii forming a uniform handle-tube passageway 502, 504. This configuration allows a wire to be fed in the handle opening 116 through the handle-tube passageway 502 504 and out the tube opening 114 forming a wire guiding means. A countersunk portion 506 of the handle 102 is adapted to engage a double flair in the tube 104.

In this embodiment, tube 104 extends almost all of the way to the handle opening 116. The handle 102 may be precision drilled for the tube to be press fit into the handle 102. In a preferred embodiment, the rear of the handle 102 may also be countersunk to accept a double flair in the tube 104 thus making the tube 102 flush fit with the end of the handle 102. The press fit producing tensile and compressive forces that frictionally secure the tube 102 to the handle 104.

In other embodiments, the tube extends varying lengths into the handle. In some embodiments the tube extends through the handle with the tube forming the handle opening. In yet other embodiments, the tube does not extend into the handle at all.

Those skilled in the art will recognize that there are many embodiments and methods of manufacture of the wire installation tool having handle and tube in accordance with the invention. For example, in one embodiment, the handle and tube are composed of the same material, such as a plastic and is formed as a single structure using a dye cast. In another embodiment the handle is formed from cellulose acetate with the tube being constructed of steel and inserted into the handle. In yet another embodiment the handle and the tube have mating threads for rigidly connecting the handle with the tube. In some embodiments, the handle and/or the tube are constructed of electrical insulating materials to prevent electrical shock. In still other embodiments the handle and/or tube are coated or sheathed in electrical insulating material to prevent shock.

Those skilled in the art will also recognize that the dimensions of the wireless tool may vary. For example, in one embodiment the tube extends approximately 18" from the handle allowing the tube to extend through both wallboards of an inside wall. The tube is constructed of steel tubing has an outside diameter of ¼", 5⁄16" and inside diameters of 3⁄16" and ⅜"respectively in two exemplary embodiments. A ¼ inch 35 degree chamfer is provided at the distal end in some embodiments. The handle may be for example approximately 4" in length allowing an average size hand to comfortably grip the handle.

Figure 6:
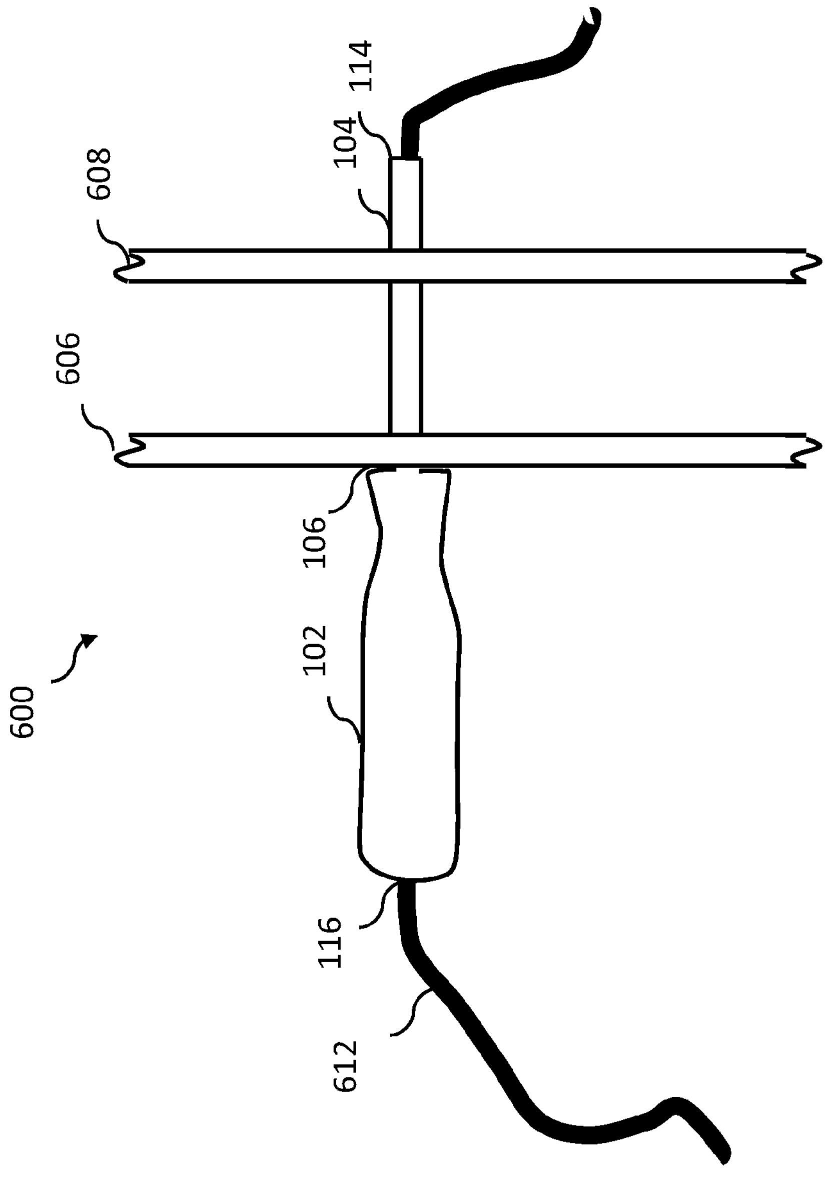
FIG. 6 shows an exemplary use of the exemplary embodiment of FIG. 1.

FIG. 6 shows an exemplary use 600 of the wire installation tool of FIG. 1. The handle 602 of the wire installation tool is placed flush against a first wall board 606 with lip 106 engaging the first wall board 606. The tube 104 extends through a first drill hole (not shown) in the first wall board 606 and through a second drill hole in a second wall board 608. A wire 612 extends through the wireless tool from the handle opening 116 to the tube opening 114.

In an exemplary use 600 of the wireless tool a technician drills a hole through the first and second wall boards 606, 608 of an inside wall. After the drill is removed the technician grips the handle 102 of the wire installation tool and inserts the tube 104 through the first and second drill holes of the first and second wall boards 606, 608 until the lip 106 engages the first wall board 606. The technician then feeds a wire 612 into the handle opening 116 until the wire 612 evacuates the tube opening 114. The technician can then remove the tool from the tool from the inside wall pulling the tool proximally with the tool riding along wire 612 until the wire is pulled completely through the tool.

Figure 7:
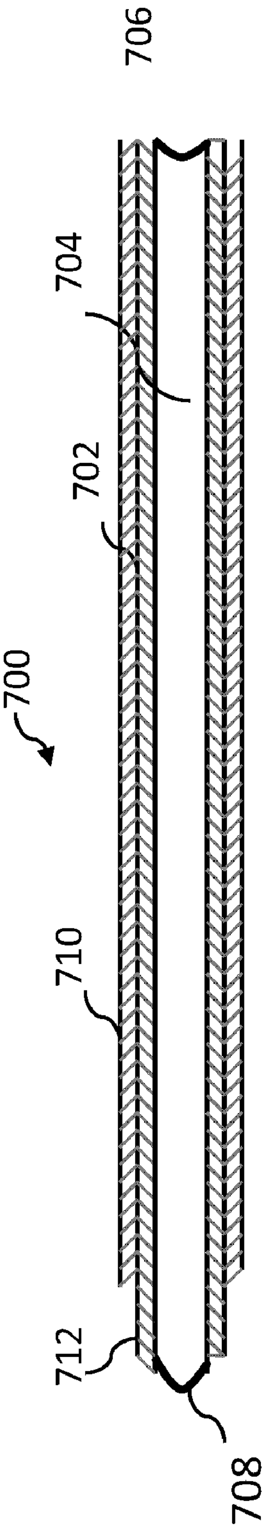
FIG. 7 shows an alternate embodiment of the tube of the present invention.

FIG. 7 shows an alternate embodiment of the tube 700 of the wireless installation tool. The inner portion 702 is cylindrical in shape and defines an inner passageway 704, a distal opening 706 and proximal opening 708. An outer portion 710 surrounds the inner portion 702 and covers most of the inner portion 702 of the tube 700. An uncovered portion 712 extends into a handle (not shown).

The inner portion 702 of the tube is formed of a rigid material such as steel. The outer portion 710 is composed of an electrical insulator for preventing shock. The electrical insulator may be composed of any insulator, for example, rubber-shrink tubing. The outer portion 710 is particularly useful when live wires may present when a technician uses the wire installation tool.

Figure 8:
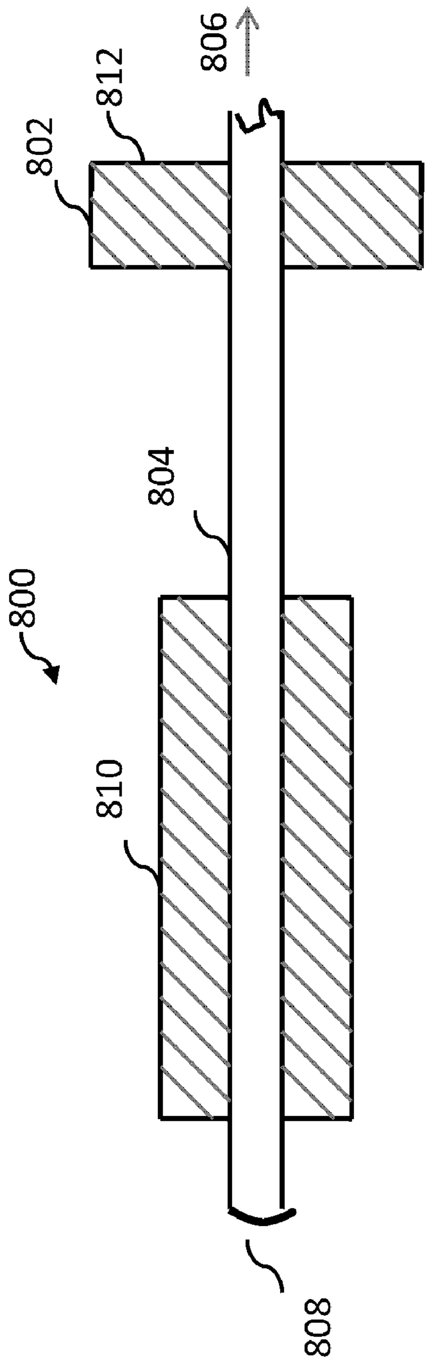
FIG. 8 shows an alternate embodiment of the handle of the present invention.

FIG. 8 shows an alternate embodiment of the handle 800 of the wireless installation tool. The handle includes a lip 802 with a planar surface 812 connected with tube 804. The tube 804 extends distally until tube opening 806. The tube 804 has a handle opening 808 at the proximal end. The tube 804 also has a grip 810 attached the tube 804.

In this embodiment a single homogenous tube, preferably of steel, provides both the handle opening 808 and the tube opening 806 forming a single homogeneous guiding means for guiding a wire. A gripping means 810 attached to the tube provides a gripping means for gripping the handle 800. The lip 812 provides a planar surface for engaging another planar surface providing an engaging means.

The previous description of the disclosed embodiments is provided to enable a person skilled in the art to make or practice the invention. Various modifications to these embodiments will readily apparent to those skilled in the art, and the generic principles defined herein may be applied to other embodiments without departing from the spirit and scope of the disclosure. Thus, the present disclosure is intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and rang of equivalency of the claims are to be embraced within their scope.

What is claimed is:

1. A wire installation tool, comprising:

a handle having a first opening for receiving a wire; and a tube connected with the handle, the tube having an annular portion that defines a second opening for evacuating the wire, the annular portion defining the second opening being substantially normal to a proximal-distal axis of the tube wherein the first opening of the handle opens into a handle passageway, the handle passageway extending through the handle to a portion of the handle that defines a wider passageway, the wider passageway having a radius larger than the handle passageway where the wider passageway meets the handle passageway, the handle substantially press fit with the tube at the wider passageway whereby the tube is secured to the handle.

2. The wire installation tool of claim 1 wherein the handle passageway and the tube define a substantially cylindrical passageway extending from the first opening to the second opening.

3. The wire installation tool of claim 1 wherein the handle has a larger outer radial diameter than the tube.

4. The wire installation tool of claim 1 wherein the handle has a lip adapted to engage a planar surface.

5. The wire installation tool of claim 1 wherein the handle is comprised of an electrical insulator.

6. The wire installation tool of claim 1 wherein the tube is comprised of an electrical insulator.

7. The wire installation tool of claim 1 wherein the tube is substantially a steel tube.

8. The Wire installation tool of claim 1 further comprising an electrically insulating sheathing formed substantially around the tube.

9. The Wire installation tool of claim 8 wherein the electrically insulating sheathing is rubber shrink tubing.

10. The wire installation tool of claim 1 wherein the first and second openings are adapted to receive and evacuate a telephone wire, a television wire or an alarm wire.

11. The wire installation tool of claim 1 wherein the tube has a chamfer near the second opening.

12. The wire installation tool of claim 1 wherein the handle has a double flair proximate to the first opening.

13. A wire installation apparatus, comprising:

a tubular handle;

a rigid tubular shaft connected to the handle, the handle and shaft forming a substantially cylindrical passageway terminating in an annular portion, the passageway adapted to guide a wire through a wall;

wherein the annular portion defines an opening and the annular portion is substantially normal to a proximal-distal axis of the tube and wherein a first opening of the tubular handle opens into a handle passageway, the handle passageway extending through the handle to a portion of the handle that defines a wider passageway, the wider passageway having a radius larger than the handle passageway where the wider passageway meets the handle passageway, the handle substantially press fit with the tube at the wider passageway whereby the tube is secured to the handle.

14. The wire installation apparatus of claim 13 wherein the tubular handle is adapted to engage the wall with the rigid tubular shaft extending through the wall.

15. The wire installation apparatus of claim 13 wherein the rigid tubular shaft is comprised of a metallic material.

16. The wire installation apparatus of claim 13 wherein the rigid tubular shaft extends at least six inches beyond the tubular handle.

17. The wire installation apparatus of claim 13 wherein the tubular handle has a longitudinal length of at least four inches.

* * * * *